(12) United States Patent
Takada et al.

(10) Patent No.: US 10,088,207 B2
(45) Date of Patent: Oct. 2, 2018

(54) THROTTLE DEVICE, AND REFRIGERATION CYCLE SYSTEM INCLUDING SAME

(71) Applicant: Saginomiya Seisakusho, Inc., Tokyo (JP)

(72) Inventors: Yasumasa Takada, Sayama (JP); Yuichiro Toyama, Sayama (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 32 days.

(21) Appl. No.: 15/303,065

(22) PCT Filed: Mar. 27, 2015

(86) PCT No.: PCT/JP2015/001799
§ 371 (c)(1),
(2) Date: Oct. 10, 2016

(87) PCT Pub. No.: WO2015/159491
PCT Pub. Date: Oct. 22, 2015

(65) Prior Publication Data
US 2017/0030616 A1  Feb. 2, 2017

(30) Foreign Application Priority Data
Apr. 17, 2014  (JP) .................. 2014-085568

(51) Int. Cl.
*F25B 41/06* (2006.01)
*F16K 1/34* (2006.01)
(Continued)

(52) U.S. Cl.
CPC .............. *F25B 41/062* (2013.01); *F16K 1/34* (2013.01); *F16K 1/38* (2013.01); *F16K 1/54* (2013.01);
(Continued)

(58) Field of Classification Search
CPC .... F25B 41/062; F25B 2500/15; F25B 41/06; F16K 1/34; F16K 1/54; F16K 15/026; F16K 17/0466; F19K 17/30
(Continued)

(56) References Cited

U.S. PATENT DOCUMENTS 2,505,933 A * 5/1950 Aughey ................ F25B 41/062
236/92 B
3,405,535 A * 10/1968 Matthies ............... F25B 41/062
236/68 D
(Continued)

FOREIGN PATENT DOCUMENTS

CN  202708102 U  1/2013
JP  S59-106771  6/1984
(Continued)

OTHER PUBLICATIONS

Extended Search Report dated Mar. 31, 2017, issued in EP Application No. 15779341.5.
(Continued)

*Primary Examiner* — Melvin Jones
(74) *Attorney, Agent, or Firm* — Workman Nydegger

(57) ABSTRACT

In a throttle device, a needle member (20) includes a tapered portion (20P) having a taper angle (2θ), and a length (X) along a center axis from a position (20PS) to an apical surface of the tapered portion (20P) is set to a value equal to or above a prescribed amount of lift (L'×cos² θ), where the position (20PS) is a position corresponding to an edge (22as) of a valve port (22a) in a state where the tapered portion (20P) is inserted in the valve port (22a) and establishes a closed state of the valve port (22a).

5 Claims, 12 Drawing Sheets

(51) Int. Cl.
*F16K 17/30* (2006.01)
*F16K 1/38* (2006.01)
*F16K 1/54* (2006.01)
*F16K 15/02* (2006.01)
*F16K 17/04* (2006.01)

(52) U.S. Cl.
CPC ........ *F16K 15/026* (2013.01); *F16K 17/0466* (2013.01); *F16K 17/30* (2013.01); *F25B 2500/15* (2013.01)

(58) Field of Classification Search
USPC ................................... 62/498, 528
See application file for complete search history.

(56) References Cited

U.S. PATENT DOCUMENTS

| | | | | |
|---|---|---|---|---|
| 5,156,188 A | * | 10/1992 | Wakita | F16K 1/36 137/625.3 |
| 2006/0043325 A1 | * | 3/2006 | Umezawa | F16K 31/047 251/129.11 |
| 2006/0219965 A1 | * | 10/2006 | Hirota | F25B 41/062 251/30.02 |
| 2007/0068194 A1 | * | 3/2007 | Ise | F25B 41/062 62/527 |
| 2008/0111089 A1 | | 5/2008 | Hasunuma | |

FOREIGN PATENT DOCUMENTS

| | | |
|---|---|---|
| JP | 3537849 B2 | 6/2004 |
| JP | 2004-218918 | 8/2004 |
| JP | 2005-214396 | 8/2005 |
| JP | 2005/265230 A | 9/2005 |
| JP | 2006-266667 | 10/2006 |
| JP | 2008/101733 A | 5/2008 |
| JP | 2008-138812 | 6/2008 |
| JP | 4897428 B2 | 3/2012 |
| WO | 2006/064865 A1 | 6/2006 |

OTHER PUBLICATIONS

International Preliminary Report on Patentability dated Oct. 27, 2016, filed in Application No. PCT/JP2015/001799, filed Mar. 27, 2015.

* cited by examiner

WHEN CLOSING VALVE

THROTTLE DEVICE, AND REFRIGERATION CYCLE SYSTEM INCLUDING SAME

TECHNICAL FIELD

The present invention relates to a throttle device, and a refrigeration cycle system including the same.

BACKGROUND ART

In the field of refrigeration systems in air-conditioning apparatuses, there has been proposed one including a differential pressure-type throttle device instead of a capillary tube serving as the throttle device. For example, a differential pressure-type throttle device like those disclosed in patent document 1 to patent document 4 is configured to optimally control a pressure of a refrigerant between an outlet of a condenser and an inlet of an evaporator in order to efficiently operate a compressor in accordance with an outside air temperature. Moreover, in a refrigeration system capable of changing the number of revolutions of the compressor, the differential pressure-type throttle device is also configured to optimally control the pressure of the refrigerant according on the number of revolutions of the compressor from the labor saving point of view.

As shown in FIG. 1 of patent document 1, the differential pressure-type throttle device comprises: a cylinder provided at a ductwork that constitutes a refrigerant flow channel; a first valve body and a second valve body each provided with a valve portion and configured to open and close a valve seat in a passage inside the cylinder; a plurality of springs each configured to bias the valve portion of the corresponding one of the first and second valve bodies such that the valve portion of the first and second valve bodies establishes a closed state of the valve seat; shaft-like members each provided with a tapered portion located inside a contracted tube portion of the corresponding one of the first and second valve bodies, and designed to form a throttle flow channel between an inner edge portion of the contracted tube portion and the tapered portion; a plurality of stoppers each coming into contact with one end of the corresponding spring, and configured to adjust elastic forces of the plurality of springs; and setscrews fitted into female screw holes in the stoppers and configured to perform positioning of the shaft-like members in an axial direction.

In such a configuration, when a differential pressure between the front and back of the above-mentioned throttle flow channel corresponding to a designed pressure of the refrigerant falls below a predetermined value, the biasing forces of the springs is adjusted by the stoppers such that the valve portions of the first valve body and the second valve body establish the closed states of the corresponding valve seats. At that time, when the valve portions of the first valve body and the second valve body establish the closed states of the valve seats, the position of the corresponding shaft-like member is adjusted by one of the setscrews such that the size of the above-mentioned throttle flow channel becomes a predetermined size. Hereby, at the time of cooling, the refrigerant passing through the passage in the cylinder is reduced in pressure by the above-described throttle flow channel, and is discharged from the cylinder. On the other hand, when the differential pressure between the front and back of the above-mentioned throttle flow channel becomes equal to or above the predetermined value, the valve portion of the first valve body establishes an open state of the valve seat, whereby the greater part of the refrigerant is discharged from the cylinder through a clearance between the valve portion of the first valve body and an inner peripheral portion of the cylinder and through elongated holes in the corresponding stopper.

PRIOR ART DOCUMENTS

Patent Document

PATENT DOCUMENT 1: Japanese Patent Application Laid-Open No. 2005-265230
PATENT DOCUMENT 2: Japanese Patent No. 4897428
PATENT DOCUMENT 3: Japanese Patent Application Laid-Open No. 2008-101733
PATENT DOCUMENT 4: Japanese Patent No. 3537849

SUMMARY OF INVENTION

In the differential pressure-type throttle device described above, there may be cases where a so-called hunting phenomenon of the valve bodies in which opening and closing actions of the first valve body and the second valve body are repeated at the relatively short intervals is caused, because when the valve portion of each of the first valve body and the second valve body transits from the closed state to the open state and then again from the open state to the closed state of the valve seat at relatively short intervals due to variations in the differential pressure between the front and back of the throttle flow channel mentioned above, the pressure of the refrigerant passing through the throttle flow passage in the cylinder varies rapidly. Hereby, this phenomenon may lead to abnormal noise and a failure in controlling the pressure of the refrigerant in the refrigeration system to a predetermined target pressure.

In view of the above-described problem, the present invention aims to provide a throttle device and a refrigeration cycle system including the same.

The throttle device and a refrigeration cycle system including the same can avoid a hunting phenomenon of a valve body, and stably control a flow rate of a refrigerant.

To achieve the above-described object, a throttle device according to the present invention comprises: a tube body provided in a ductwork supplying a refrigerant, the tube body having open end portions provided at two ends and communicating with the ductwork; a valve seat disposed inside the tube body and having a valve port; a needle member provided to be capable of approaching or moving away from the valve port of the valve seat, and having a tapered portion having a taper angle $2\theta$ and configured to control an aperture area of the valve port; and adjusting means for adjusting a prescribed amount of lift $L'$ of the tapered portion of the needle member according to a difference in pressure of the refrigerant between the open end portions of the tube body, wherein a maximum insertion length X is equal to or above a value expressed by the prescribed amount of lift $L' \times \cos 2\theta$, the maximum insertion length X being a length of the tapered portion of the needle member inserted into the valve port when the tapered portion makes the aperture area of the valve port nearly zero.

In addition, when the difference in pressure of the refrigerant between the open end portions of the tube body is equal to or above a predetermined value, a distance of the tapered portion of the needle member from the valve port may exceed the prescribed amount of lift. The adjusting means may include a coil spring configured to bias the tapered portion of the needle member in a direction to approach the valve port, and an adjustment screw configured to adjust an amount of deflection of the coil spring.

Moreover, the valve seat may include a communication passage, and the communication passage communicates between a first portion in the tube body where the tapered portion of the needle member is provided and a second portion in the tube body which communicates with one of the open end portions.

A refrigeration cycle system according to the present invention comprises: an evaporator; a compressor; and a condenser, wherein the throttle device described above is disposed at a ductwork provided between an outlet of the condenser and an inlet of the evaporator.

According to the throttle device and the refrigeration cycle system including the same of the present invention, the maximum insertion length X is equal to or above a value expressed by the prescribed amount of lift L'×$\cos^2$ θ, the maximum insertion length X being the length of the tapered portion of the needle member inserted into the valve port when the tapered portion makes the aperture area of the valve port nearly zero. As a result, the aperture area of the valve port is moderately increased. Accordingly, it is possible to avoid a hunting phenomenon of the valve body, and also to control a flow rate of the refrigerant stably.

DESCRIPTION OF EMBODIMENTS

Figure 1A:
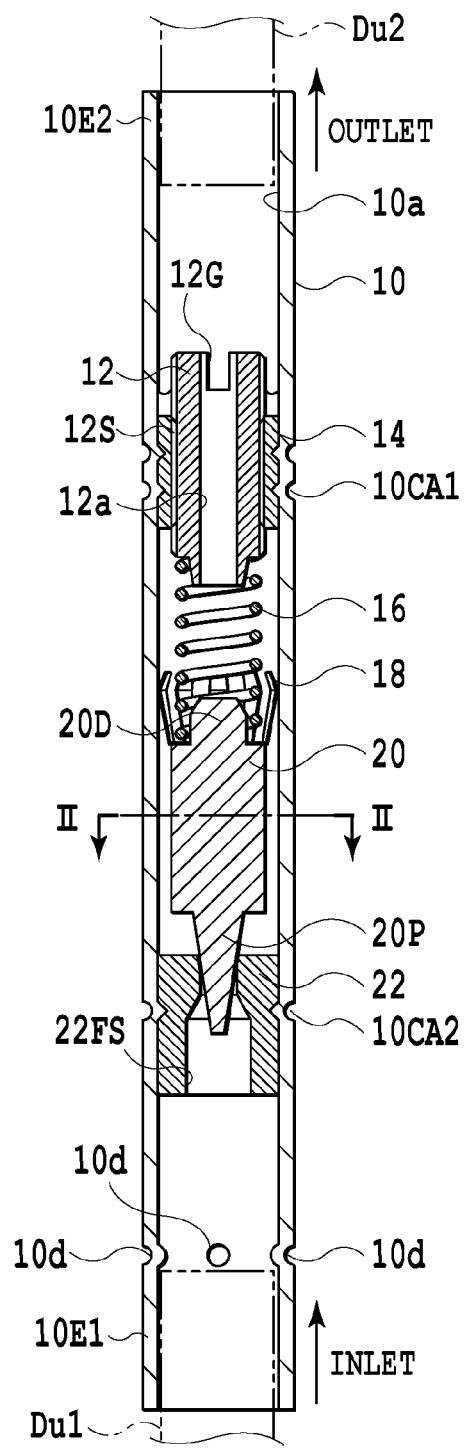
FIG. 1A is a cross-sectional view showing a first embodiment of a throttle device according to the present invention.
Figure 1B:
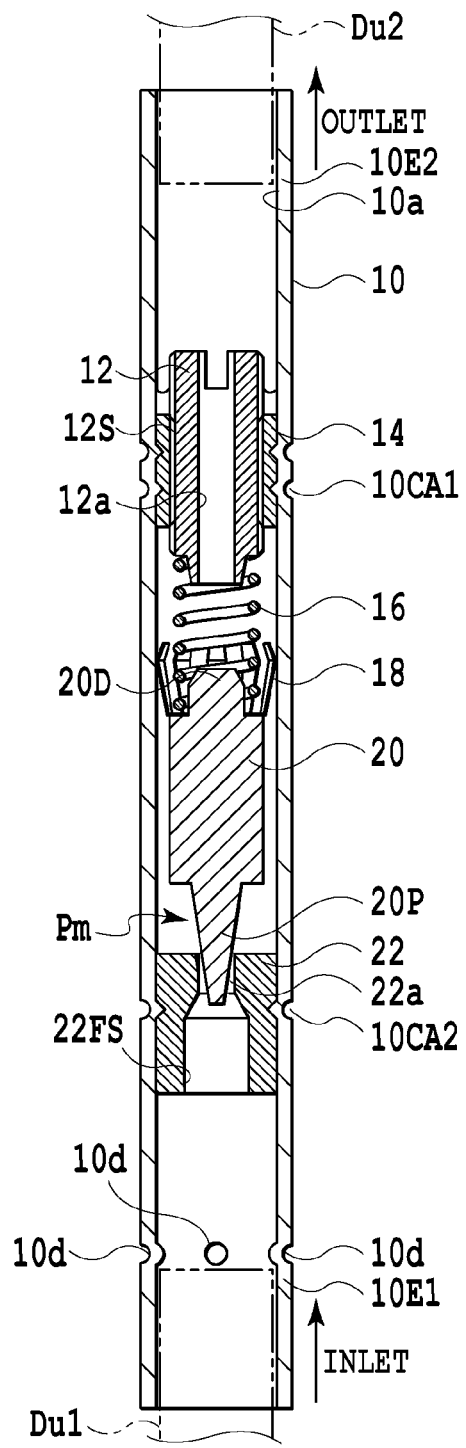
FIG. 1B is a cross-sectional view showing the first embodiment of the throttle device according to the present invention.

Each of FIG. 1A and FIG. 1B shows a configuration of a throttle device according to a first embodiment of the present invention.

Figure 3:
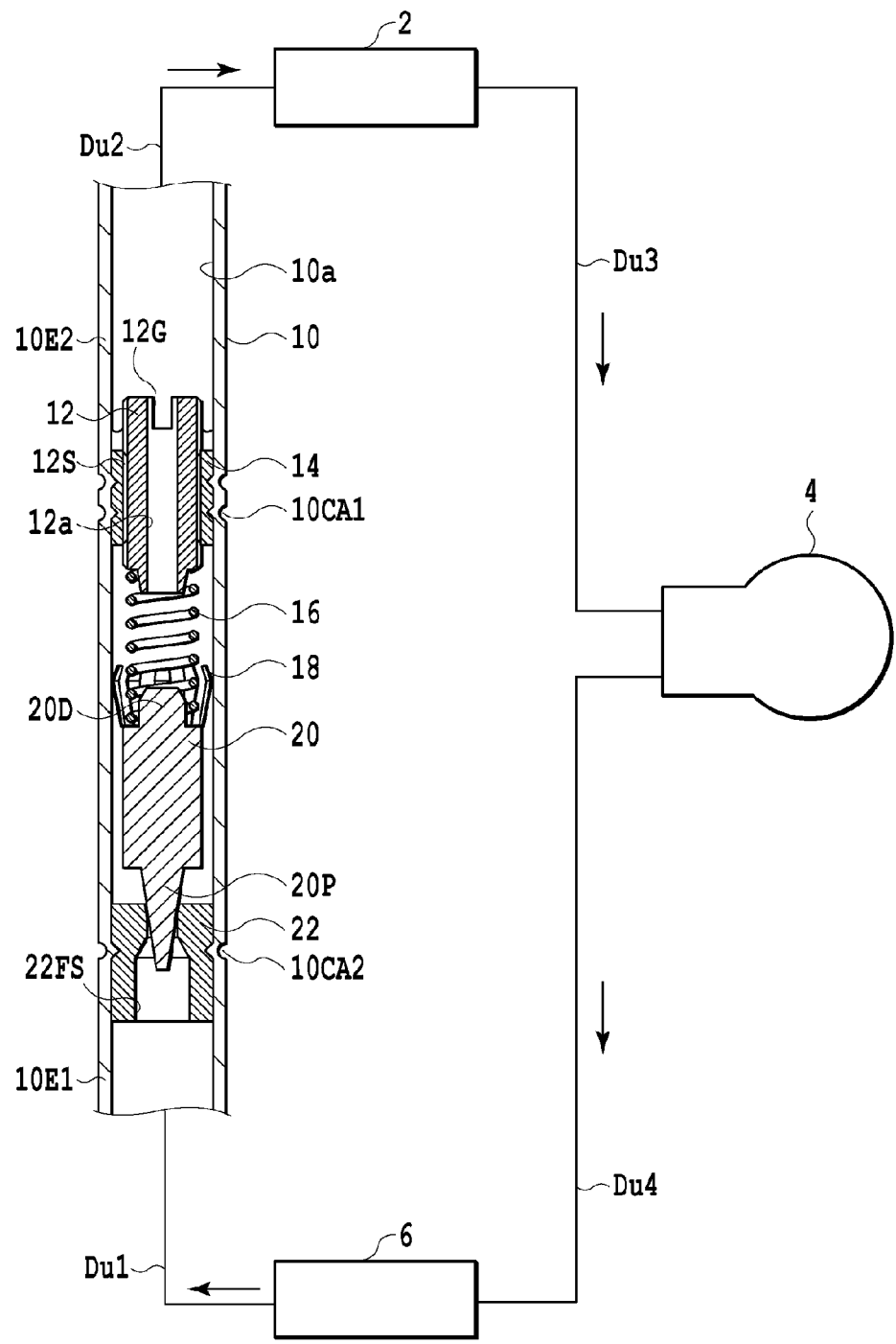
FIG. 3 is a diagram schematically showing a configuration of an example of a refrigeration cycle system including the first embodiment of the throttle device according to the present invention.

As schematically shown in FIG. 3, for example, the throttle device is disposed between an outlet of a condenser 6 and an inlet of an evaporator 2 in a ductwork of a refrigeration cycle system. The throttle device is coupled to a primary duct Du1 at one end 10E1 of a tube body 10 to be described later, and is coupled to a secondary duct Du2 at another end 10E2 of the tube body 10 from which a refrigerant is discharged. The primary duct Du1 connects the outlet of the condenser 6 to the throttle device while the secondary duct Du2 connects the inlet of the evaporator 2 to the throttle device. As shown in FIG. 3, a compressor 4 is connected between an outlet of the evaporator 2 and an inlet of the condenser 6 by using a duct Du3 to be coupled to the outlet of the evaporator 2 and a duct Du4 to be coupled to the inlet of the condenser 6. The drive of the compressor 4 is controlled by a not-illustrated control unit. Thus, the refrigerant is circulated in the refrigeration cycle system along with arrows indicated in FIG. 3.

As shown in the enlarged view of FIG. 1A, the throttle device comprises, as its main elements: the tube body 10 coupled between the primary duct Du1 and the secondary duct Du2 of the above-described refrigeration cycle system; a valve seat 22 fixed to an inner peripheral portion of the tube body 10 and constituting a flow rate adjustment unit which adjusts a flow rate of the refrigerant; a needle member 20; a coil spring 16 which biases the needle member 20 in a direction to approach the valve seat 22; an adjustment screw 12 which adjusts a biasing force of the coil spring 16; and a blade member 18 which slows down a moving speed of the needle member 20.

Of the tube body 10 having a predetermined length and a predetermined diameter, the one end 10E1 to which the refrigerant is introduced is coupled to the primary duct Du1 that is connected to the condenser, and the other end 10E2 from which the refrigerant is discharged is coupled to the secondary duct Du2 connected to the evaporator. An end portion of the primary duct Du1 is positioned by positioning projections 10d on the tube body 10 to be described later.

An outer peripheral portion of the valve seat 22 is fixed to an intermediate portion of the inner peripheral portion of the tube body 10, which is located away by a predetermined distance from the one end 10E1. The valve seat 22 is fixed by using a projection, which is formed in conjunction with a recess 10CA2 provided in the tube body 10 by swaging, and bites into the outer peripheral portion of the valve seat 22.

At an inner central portion of the valve seat 22, there is provided a valve port 22a which allows insertion of a tapered portion 20P of the needle member 20 to be described later. The valve port 22a is formed from: a reduced diameter part having a predetermined diameter φD and extending along the center axis of the valve seat 22; a tapered part being continuous with the reduced diameter part and gradually spreading toward the one end 10E1; and a cylindrical part 22FS formed at an end of the tapered part.

Figure 4A:
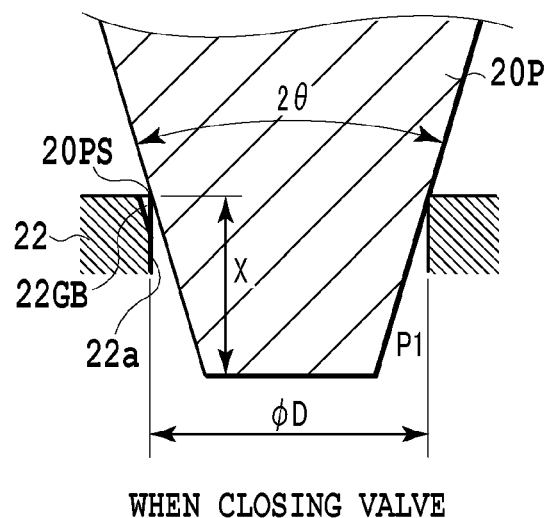
FIG. 4A is a partial enlarged cross-sectional view made available for explaining operations in the embodiment shown in FIG. 1A.

As shown in the enlarged view of FIG. 4A, a bleed groove 22GB as a communication passage is formed at a given position of a circular open end of the reduced diameter part of the valve port 22a. Namely, the bleed groove 22GB is formed on a straight line that passes through the center of the circle of the open end of the reduced diameter part and in a radial direction of the open end. One end of the bleed groove 22GB has a substantially V-shaped transverse section which intersects the end surface of the open end of the reduced diameter part at a predetermined angle. Another end of the bleed groove 22GB is opened at a predetermined position on an inner peripheral surface of the reduced diameter part.

In this way, a pressure of the refrigerant in a second portion, which is a portion adjacent to the cylindrical part 22FS on the one end 10E1 side of the inner peripheral portion of the tube body 10, constantly acts on the tapered portion 20P of the needle member 20, and the second portion communicates with a first portion located around the valve port 22a to be described later through a clearance between the other end of the bleed groove 22GB and an outer peripheral surface of the tapered portion 20P, and through the bleed groove 22GB. Thus, it is possible to suppress a sudden increase in an intermediate pressure Pm in response to an increase in amount of lift of the tapered portion 20P of the needle member 20.

Moreover, in case the tapered portion 20P of the needle member 20 moves in a direction to establish a closed state of the valve port 22a, the pressure of the refrigerant on the one end 10E1 side constantly acts on the tapered portion 20P of the needle member 20, and the one end 10E1 side communicates with the first portion through the clearance between the other end of the bleed groove 22GB and the outer peripheral surface of the tapered portion 20P, and through the bleed groove 22GB. Thus, there is no risk of the tapered portion 20P of the needle member 20 biting into a peripheral edge of the valve port 22a.

Figure 2:
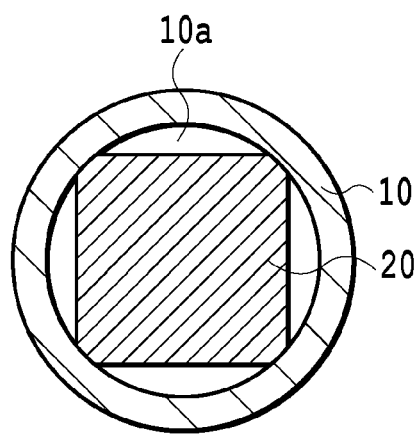
FIG. 2 is a partial cross-sectional view taken along II-II line in FIG. 1A.

As shown in FIG. 2, the needle member 20 having a rectangular cross section has the tapered portion 20P located at one end portion opposed to the valve seat 22, and a spring guide portion 20D in a shape of a projection located at an end portion opposed to the coil spring 16 to be described later. As shown in FIG. 2, flow channels 10a are formed between the inner peripheral portion of the tube body 10 and an outer peripheral portion in a region of the needle member 20 which is located between the tapered portion 20P and the spring guide portion 20D. As shown in the partial enlarged view of FIG. 4A, the tapered portion 20P in a truncated conical shape has a taper angle $2\theta$. In addition, an end surface of the tapered portion 20P has a diameter $\phi a$ which is smaller than the diameter $\phi D$ (see FIG. 4D). Furthermore, as shown in FIG. 4A, a length of the tapered portion 20P along the center axis of the needle member 20 has a length equal to or above a predetermined maximum insertion length X ($\geq L' \cos^2 \theta$). However, as shown in FIG. 4A, it is to be noted that the maximum insertion length X means a length along the center axis of the needle member 20 measure a length along the center axis of the needle member 20 from a position 20PS to an apical surface of the tapered portion 20P inserted in the valve port 22a, the position 20PS corresponding to an edge 22as of the valve port 22a when the tapered portion 20P establishes the closed state of the valve port 22a. A prescribed amount of lift L' represents an amount of lift of the needle member 20 at the time of a predetermined maximum differential pressure depending on the refrigerant (see FIG. 4C). Namely, the prescribed amount of lift L' means an amount of lift at the maximum differential pressure assumed when a maximum frequency of the compressor is 100 Hz at the time of a normal operation on the assumption of using various refrigerants to be described later. Here, the time of the normal operation means the time when a flow rate of the refrigerant is adjusted by variably controlling an aperture of the throttle device depending on the differential pressure. In addition, the prescribed amount of lift L' is adjusted according to an inside diameter of the above-described valve port 22a, the taper angle $2\theta$, and a spring constant of the coil spring 16 to be described later.

To set the required prescribed amount of lift L', a required clearance (an aperture area) of a throttle portion formed between the tapered portion 20P of the needle member 20 and the reduced diameter part of the valve port 22a at the maximum differential pressure is preset for each throttle device. Then, the required prescribed amount of lift L' is set on the basis of the required clearance (the aperture area), the inside diameter of the reduced diameter part of the valve port 22a, and the taper angle $2\theta$ of the tapered portion 20P of the needle member 20.

Figure 4B:
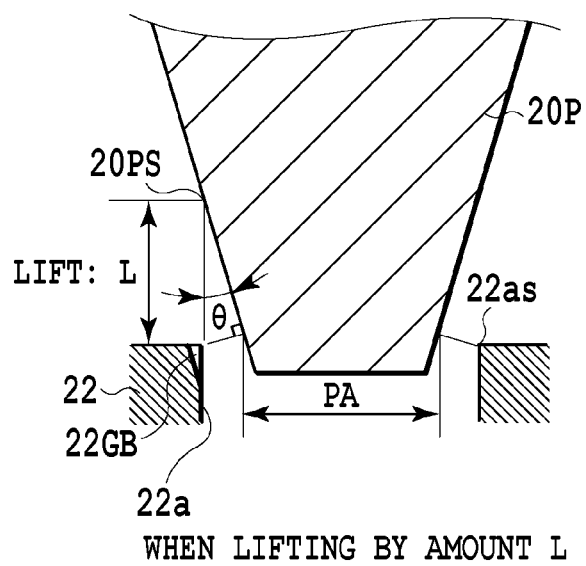
FIG. 4B is a partial enlarged cross-sectional view made available for explaining operations in the embodiment shown in FIG. 1A.

When an amount of lift L is equal to or below the prescribed lift L', the throttle portion mentioned above is a location (the narrowest portion) where an intersection of a perpendicular line (see FIG. 4B and FIG. 4C) drawn from the edge 22as of the valve port 22a toward a generatrix of the tapered portion 20P and the generatrix of the tapered portion 20P is closest to the edge 22as of the valve port 22a. An area of a conical surface drawn with the perpendicular line constitutes the aperture area of the throttle portion mentioned above. In this case, the conical surface around the center axis of the tapered portion 20P drawn with the perpendicular line constitutes a boundary surface that indicates a pressure being an intermediate between the pressure of the refrigerant on the one end 10E1 side and the intermediate pressure Pm at the first portion. In addition, as shown in FIG. 4B, a circle drawn by an intersection of the above-described perpendicular line and the generatrix of the tapered portion 20P defines a pressure-receiving area PA for the pressure of the refrigerant on the one end 10E1 side which acts on the tapered portion 20P. Accordingly, when the amount of lift L is equal to or below the prescribed amount of lift L', the aperture area of the throttle portion is continuously increased as the area of the above-described conical surface drawn with the perpendicular line.

Figure 4C:
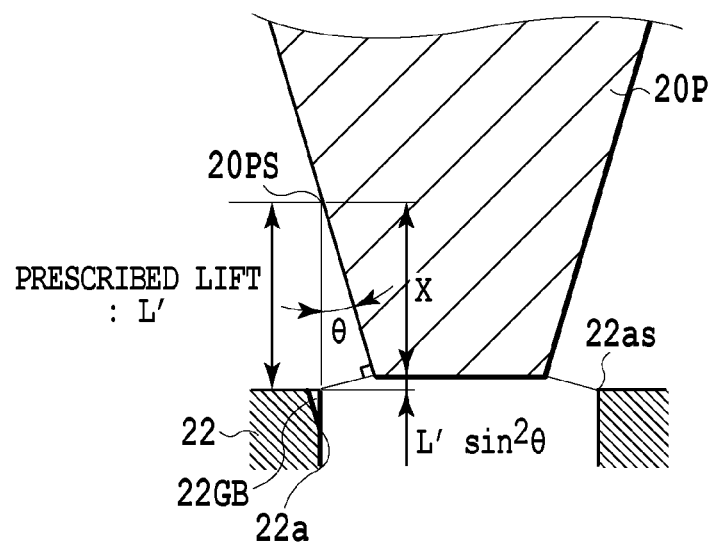
FIG. 4C is a partial enlarged cross-sectional view made available for explaining operations in the embodiment shown in FIG. 1A.
Figure 4D:
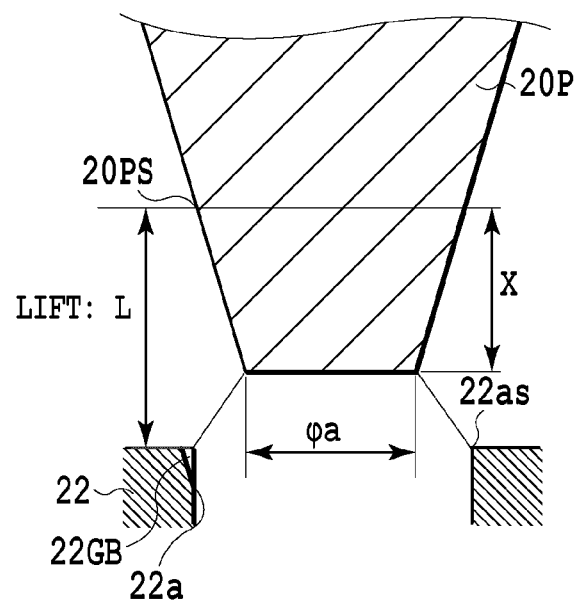
FIG. 4D is a partial enlarged cross-sectional view made available for explaining operations in the embodiment shown in FIG. 1A.

On the other hand, when the amount of lift L exceeds the prescribed lift L', the aperture area of the throttle portion is equivalent to an area of a conical surface around the center axis of the tapered portion 20P, which is drawn with a line connecting the intersection of the generatrix and the end surface of the tapered portion 20P to the edge 22as of the valve port 22a as shown in FIG. 4D. Accordingly, while the aperture area of the throttle portion is continuously increased when the amount of lift L is equal to or below the prescribed lift L', the aperture area of the throttle portion suddenly starts a sharp increase once the amount of lift L exceeds the prescribed lift L'. As a consequence, the intermediate pressure Pm rises sharply.

For example, the prescribed amount of lift L' is obtained when R32 is the refrigerant and the differential pressure (a difference between an inlet pressure on the one end 10E1 side and an outlet pressure on the other end 10E2 side) reaching the maximum at the time of the normal operation is equal to 1.98 MPa. In this case, as shown in FIG. 4C, the maximum insertion length X is set to a value satisfying $X \geq L' \cos^2 \theta$. Namely, when the maximum differential pressure is equal to 1.98 MPa, the prescribed amount of lift L' is expressed as the distance from the position 20PS at the tapered portion 20P located away from the valve seat 22 as described above to the edge 22as of valve port 22 of the valve seat 22. At this time, the maximum insertion length X is set to the value satisfying $X \geq L' \cos^2 \theta$.

For example, to set the prescribed amount of lift L' in the case where R32 is the refrigerant, the maximum differential pressure is equal to 1.98 MPa at the time of the normal operation, the inside diameter $\phi D$ of the valve port 22a is equal to 2 mm, and the taper angle 2θ of the needle member 20 is equal to 17°, the prescribed amount of lift L' is set to 0.8 mm by adjusting the biasing force of the coil spring 16 to be described later with the adjustment screw 12. An actuation pressure with which the tapered portion 20P of the needle member 20 starts moving is set by adjusting the biasing force of the coil spring 16. Accordingly, adjusting means for adjusting the prescribed lift L' comprises the adjustment screw 12 and the coil spring 16.

In addition, when any of R410A, R22, and R134a is the refrigerant and the above-described maximum differential pressure is equal to any of 1.93 MPa, 1.2 MPa, and 0.82 MPa, respectively, the distance from the position 20PS at the tapered portion 20P located away from the valve seat 22 as described above to the edge 22as of valve port 22 of the valve seat 22 is equivalent to the prescribed amount of lift L' of the needle member 20. At this time, the maximum insertion length X is set to the value satisfying $X \geq L' \cos^2 \theta$.

Figure 7:
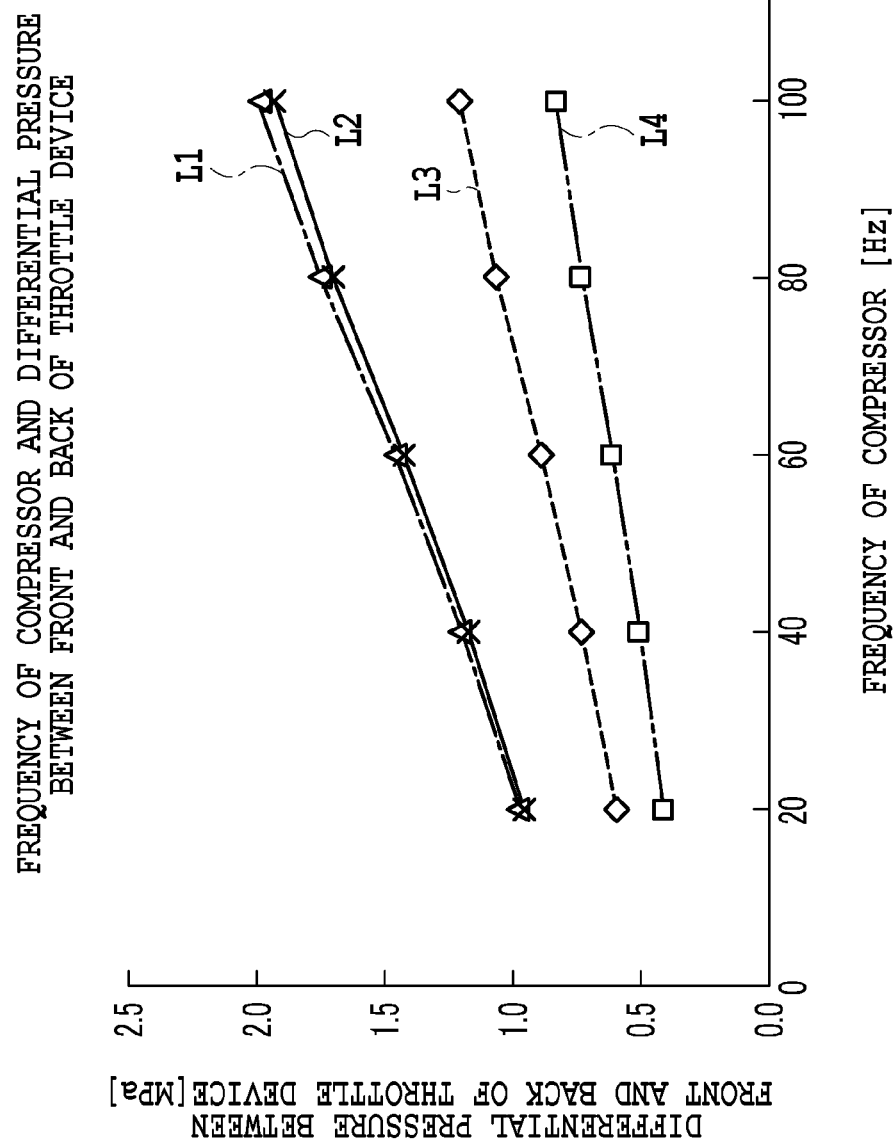
FIG. 7 is a characteristic diagram showing characteristic lines, each of which indicates a change in differential pressure between the front and back of the throttle device according to a frequency of a compressor, in light of each of refrigerants.

The aforementioned differential pressures of the respective refrigerants R32, R410A, R22, and R134a change linearly depending on the frequency of the compressor as indicated with characteristic lines L1, L2, L3, and L4 in FIG. 7. In FIG. 7, the vertical axis indicates the above-mentioned differential pressure while the horizontal axis indicates the frequency of a variable speed motor of the compressor, and each of the characteristic lines L1, L2, L3, and L4 indicates a change in differential pressure of the corresponding refrigerant with the frequency.

One end portion of the coil spring 16 is engaged with the spring guide portion 20D of the needle member 20. Another end portion of the coil spring 16 is engaged with a spring holder of the adjustment screw 12.

The adjustment screw 12 has a male screw portion 12S located on an outer peripheral part, and a through-hole 12a located at an inner central part. The male screw portion 12S is fitted into a female screw of an adjustment screw supporting portion 14, which is fixed to the inner peripheral portion of the tube body 10. The adjustment screw supporting portion 14 is fixed by using projections, which are formed in conjunction with recesses 10CA1 provided in the tube body 10 by swaging, and bite into the adjustment screw supporting portion 14. A groove 12G to be engaged with a tip end of a screwdriver is formed in an end portion of the adjustment screw 12 near the other end 10E2 of the tube body 10. Accordingly, an amount of deflection of the coil spring 16 is adjusted by rotating and moving the adjustment screw 12 using the tip end of the screwdriver, and the biasing force of the coil spring 16 corresponding to a designed pressure of the refrigerant is thus adjusted. Namely, at the time of the predetermined differential pressure mentioned above, the biasing force of the coil spring 16 is adjusted such that the position 20PS at the tapered portion 20P coincides with the position representing the prescribed amount of lift L' of the needle member 20. The spring constant of the coil spring 16 is set to about 2 N/mm, for example.

The blade member 18 is formed from a metal thin plate material, for example, and is provided with ten contact pieces that are radially arranged. In this way, tip ends of the respective contact pieces which are elastically deformable come into slidable contact with the inner peripheral surface of the tube body 10 while applying certain loads, thereby slowing down the moving speed of the needle member 20.

In the above-described configuration, the refrigerant R32, for instance, is supplied from the primary duct Du1 into the tube body 10. Due to the pressure of the refrigerant, the tapered portion 20P of the needle member 20 starts to move away from the reduced diameter part of the valve port 22a against the biasing force of the coil spring 16 as shown in FIG. 1B and FIG. 4B.

Figure 5:
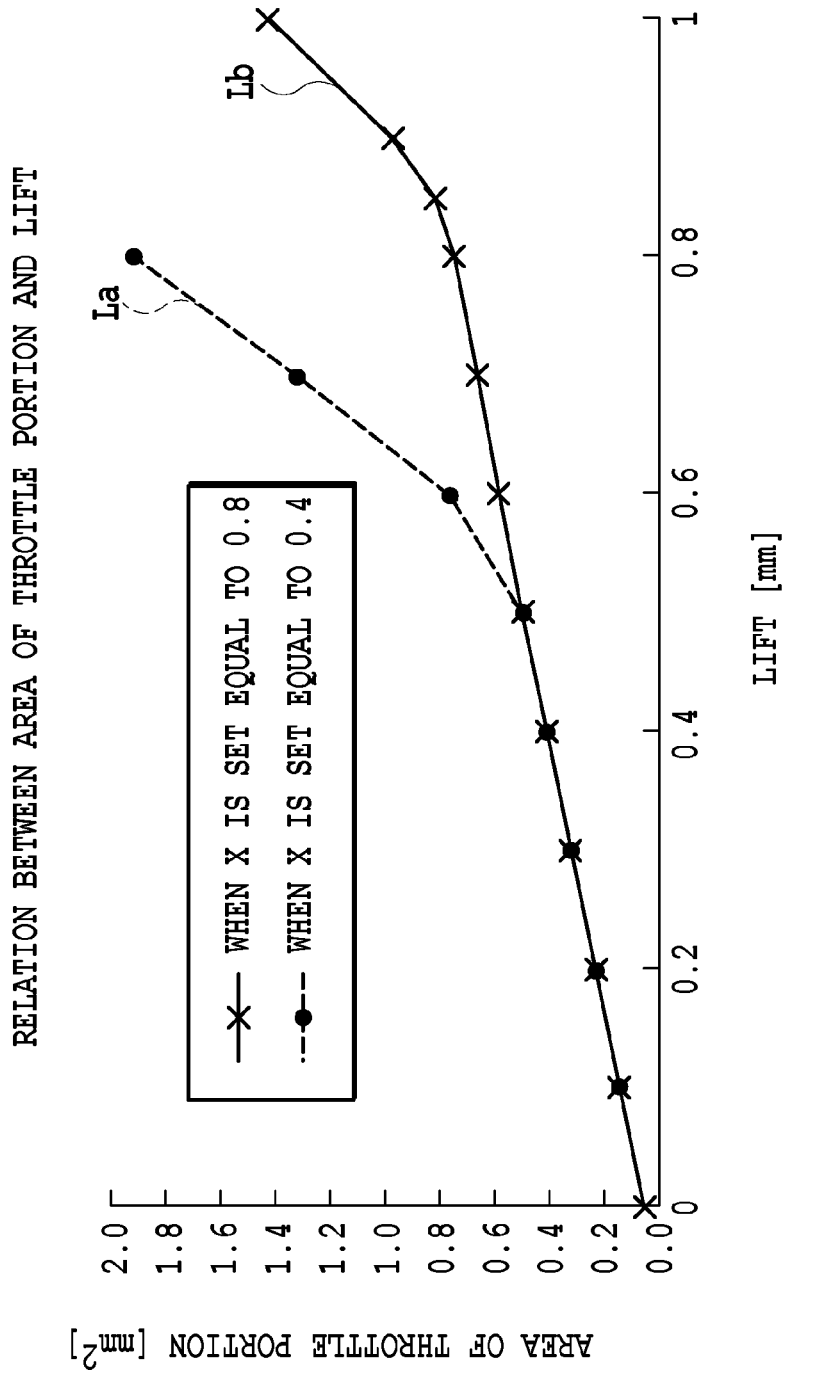
FIG. 5 is a characteristic diagram showing characteristic lines, each of which indicates a change in area of a throttle portion according to an amount of lift, in light of each of maximum insertion lengths.

At that time, as indicated with a characteristic line Lb in FIG. 5, the aperture area of the throttle portion is increased according to a straight line with a gentle gradient until the position 20PS at the tapered portion 20P reaches the prescribed amount of lift L' shown in FIG. 4C depending on the amount of lift L. When the amount of lift L exceeds the prescribed amount of lift L' (=0.8 mm), the aperture area of the throttle portion is sharply increased thereafter.

Note that in FIG. 5, the vertical axis indicates the aperture area of the throttle portion while the horizontal axis indicates the amount of lift L. The characteristic line Lb shows the change in the aperture area of the throttle portion depending on the amount of lift L when the maximum insertion length X is set to 0.8 mm, and a characteristic line La shows a change in the aperture area of the throttle portion depending on the amount of lift L when the maximum insertion length X is set to 0.4 mm.

Figure 6:
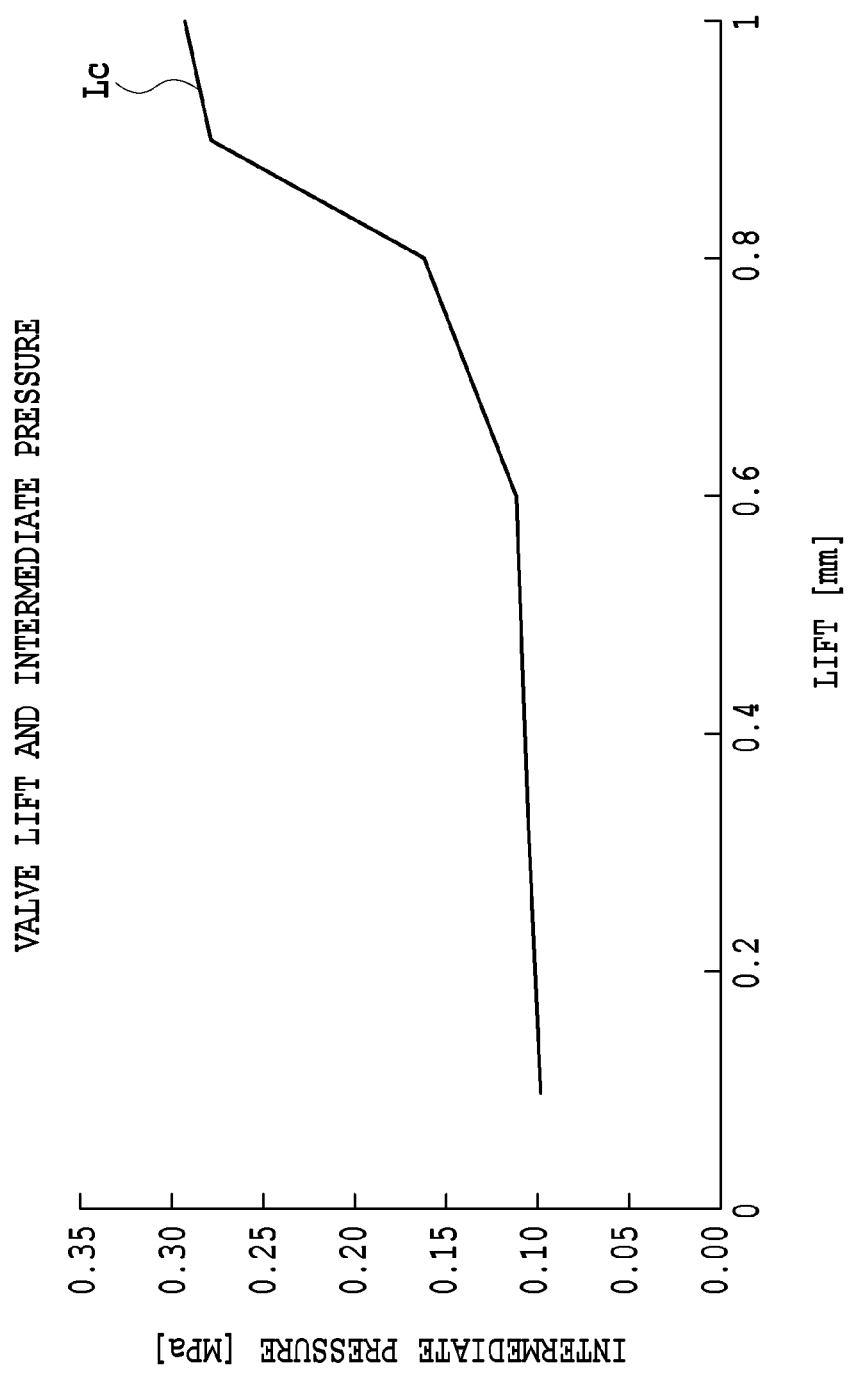
FIG. 6 is a characteristic diagram showing a characteristic line indicating a change in intermediate pressure according to the amount of lift.

In addition, the intermediate pressure Pm of the first portion, which is located around the tapered portion 20P of the needle member 20 and the valve port 22a of the valve seat 22 inside the tube body 10, is gradually increased along with a gradual increase in the aperture area of the throttle portion described above, i.e., along with an increase in the amount of lift L of the tapered portion 20P of the needle member 20 as indicated with a characteristic line Lc in FIG. 6. Moreover, the intermediate pressure Pm is sharply increased when the amount of lift L exceeds the prescribed amount of lift L' (=0.8 mm). Namely, the tapered portion 20P of the needle member 20 is completely pulled out of the valve port 22a of the valve seat 22 at a point between the above-mentioned predetermined differential pressure and a saturation pressure corresponding to each refrigerant at 65° C. Preferably, the tapered portion 20P of the needle member 20 is completely pulled out of the valve port 22a of the valve seat 22 at a point equal to or above the predetermined differential pressure.

Accordingly, foreign substances and the like deposited on the valve port 22a are washed away to the other end 10E2 side. When the amount of lift L of the tapered portion 20P of the needle member 20 is equal to or below the prescribed lift L', the pressure of the refrigerant on the one end 10E1 side acts on the pressure-receiving area PA of the tapered portion 20P. In addition, even when the valve port 22a of the valve seat 22 is in the closed state, communication with the first portion is established through the clearance between the other end of the bleed groove 22GB and the outer peripheral surface of the tapered portion 20P and through the bleed groove 22GB. Accordingly, the intermediate pressure Pm corresponding to a pressure on a primary side constantly acts on the needle member 20, whereby the flow rate of the refrigerant is stably controlled immediately after the increase in the amount of lift of the needle member 20, in such a way that the intermediate pressure Pm is kept from a sharp change and a flow rate characteristic of the refrigerant is smoothed immediately after the increase in the amount of lift.

Furthermore, the flow rate of the refrigerant is stably controlled in a range up to 100 Hz frequency of the motor in the compressor, which is assumed in case of a cooling operation. Accordingly, it is also possible to suppress a rise in discharge temperature of the compressor attributed to a frequency increase, as may occur in the case of using a capillary tube. As a consequence, it is possible to maximize the performance of the compressor.

On the other hand, when the maximum insertion length X is equal to 0.4 mm, (X<L' cos² θ), as indicated with the characteristic line La in FIG. 5, the intermediate pressure Pm is sharply increased at a point of 0.6 mm before the amount of lift reaches the prescribed amount of lift L', and the pressure of the refrigerant on the one end 10E1 side is also sharply increased. In this case, there is a risk of occurrence of a hunting phenomenon.

Figure 8:
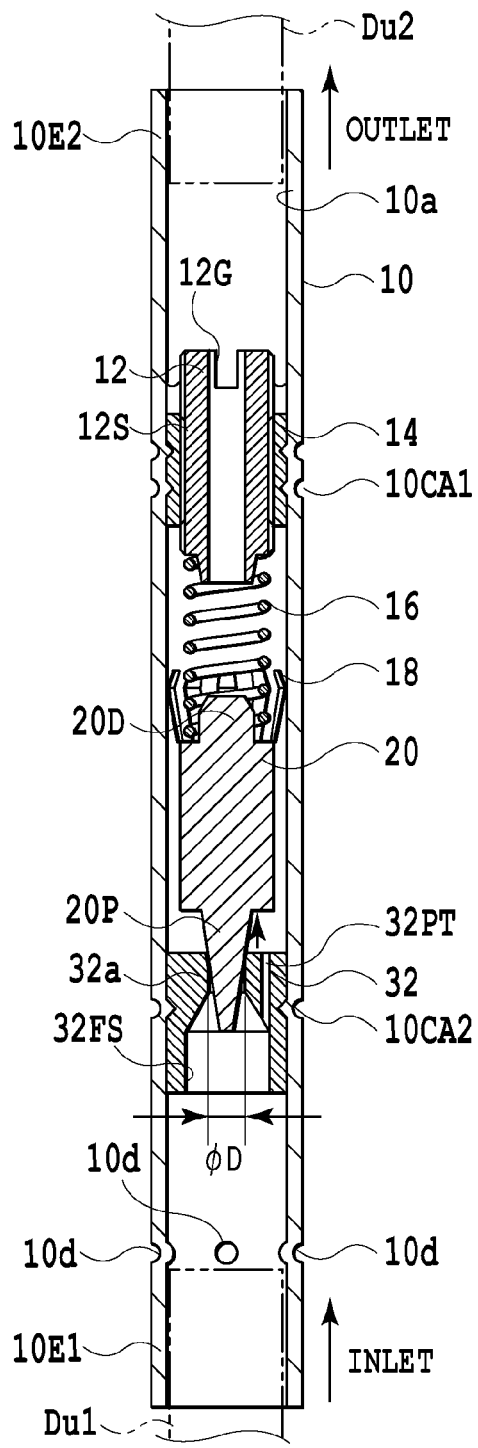
FIG. 8 is a cross-sectional view showing a second embodiment of a throttle device according to the present invention.

FIG. 8 shows a configuration of a throttle device according to a second embodiment of the present invention.

In the example shown in FIG. 8, a valve seat 32 is provided with a valve support 32a, and moreover, a bypass 32PT serving as a communication passage that establishes communication between a cylindrical portion to be described later and a portion to house the needle member 20. Note that in FIG. 8, the same constituents as those in FIG. 1A will be denoted by the same reference signs and overlapping description thereof will be omitted.

As schematically shown in FIG. 3, for instance, the throttle device is disposed between the outlet of the condenser 6 and the inlet of the evaporator 2 in the ductwork of the refrigeration cycle system as with the example shown in FIG. 1A.

The throttle device comprises, as its main elements: the tube body 10 coupled to the ductwork of the above-mentioned refrigeration cycle system; the valve seat 32 fixed to the inner peripheral portion of the tube body 10 and constituting the flow rate adjustment unit which adjusts the flow rate of the refrigerant; the needle member 20; the coil spring 16 which biases the needle member 20 in a direction to approach the valve seat 32; the adjustment screw 12 which adjusts the biasing force of the coil spring 16; and the blade member 18 which slows down the moving speed of the needle member 20.

An outer peripheral portion of the valve seat 32 is fixed to the intermediate portion of the inner peripheral portion of the tube body 10, which is located away by a predetermined distance from one end 10E1 thereof. The valve seat 32 is fixed by using the projection, which is formed in conjunction with the recess 10CA2 provided in the tube body 10 by swaging, and bites into the outer peripheral portion.

At an inner central portion of the valve seat 32, there is provided a valve port 32a which allows insertion of the tapered portion 20P of the needle member 20. The valve port 32a is formed from: a reduced diameter part having a predetermined diameter ϕD and extending along the center axis of the valve seat 32; a tapered part being continuous with the reduced diameter part and gradually spreading toward the one end 10E1; and a cylindrical part 32FS formed at an end of the tapered part.

At a position adjacent to the valve port 32a, the bypass 32PT is formed along a direction of flow of the refrigerant. The position of the bypass 32PT is set to such a position closer to the center axis of the needle member 20 than a clearance between the outer peripheral portion of the needle member 20 and the inner peripheral portion of the tube body 10 is, such that the intermediate pressure Pm at the first portion mentioned above does not cause a sudden change between the points before and after an opening or closing operation of the valve with the needle member 20, and that the bypass 32PT is not located at a position opposed to the position of the clearance. In this way, even in the state where the tapered portion 20P of the needle member 20 completely closes an open end of the valve port 32a, the pressure of the refrigerant in a second portion, which is a portion adjacent to the cylindrical part 32FS on the one end 10E1 side of the inner peripheral portion of the tube body 10, constantly acts on the tapered portion 20P of the needle member 20 through the bypass 32PT. Thus, it is possible to suppress a sudden increase in the intermediate pressure Pm in response to an increase in the amount of lift of the tapered portion 20P of the needle member 20. In addition, the flow rate of the refrigerant is stably controlled in such a way that the flow rate characteristic is smoothed immediately after the increase in the amount of lift.

Moreover, in case the tapered portion 20P of the needle member 20 moves in a direction to establish a closed state of the valve port 32a, the pressure of the refrigerant on the one end 10E1 side constantly acts on the tapered portion 20P of the needle member 20 through the bypass 32PT. Thus, there is no risk of the tapered portion 20P of the needle member 20 biting into the valve port 32a.

Accordingly, as in the throttle device of each of the first embodiment and the second embodiment of the present invention, when either the bleed groove or the bypass serving as the communication passage is combined with the configuration in which the maximum insertion length X is set to a value satisfying X≥L' cos² θ, the flow rate characteristic is smoothed from a start-up point (at the time of opening the valve) to a point of increase in the amount of lift. As a consequence, the present invention exerts an effect to eliminate occurrence of hunting throughout the control region.

Note that the above-described communication passage is not limited to the examples including the bleed groove 22GB and the bypass 32PT as in the first embodiment and the second embodiment. For instance, a very small aperture area of the throttle portion may be secured as the communication passage even in the state where the valve is closed.

REFERENCE SIGNS LIST 2 evaporator
4 compressor
6 condenser
10 tube body
12 adjustment screw
16 coil spring
20 needle member
22, 32 valve seat
22GB bleed groove
32PT bypass

The invention claimed is:

1. A throttle device comprising:
a tube body provided in a ductwork supplying a refrigerant, the tube body having open end portions provided at two ends and communicating with the ductwork;
a valve seat disposed inside the tube body and having a valve port;
a needle member provided to be capable of approaching or moving away from the valve port of the valve seat, and having a tapered portion having a taper angle 2θ and configured to control an aperture area of the valve port; and
adjusting means for adjusting a prescribed amount of lift L' of the tapered portion of the needle member according to a difference in pressure of the refrigerant between the open end portions of the tube body,
wherein a maximum insertion length X is equal to or above a value expressed by the prescribed amount of lift L'×cos² θ, the maximum insertion length X being a length of the tapered portion of the needle member inserted into the valve port when the tapered portion makes the aperture area of the valve port nearly zero.

2. The throttle device according to claim 1, wherein when the difference in pressure of the refrigerant between the open end portions of the tube body is equal to or above a predetermined value, a distance of the tapered portion of the needle member from the valve port exceeds the prescribed amount of lift.

3. The throttle device according to claim 1, wherein the adjusting means comprises:
   a coil spring configured to bias the tapered portion of the needle member in a direction to approach the valve port; and
   an adjustment screw configured to adjust an amount of deflection of the coil spring.

4. The throttle device according to claim 1, wherein
   the valve seat has a communication passage, and
   the communication passage communicates between a first portion in the tube body where the tapered portion of the needle member is provided and a second portion in the tube body which communicates with one of the open end portions.

5. A refrigeration cycle system comprising:
   an evaporator;
   a compressor; and
   a condenser,
      wherein the throttle device according to claim 1 is disposed at a ductwork provided between an outlet of the condenser and an inlet of the evaporator.

* * * * *